United States Patent
Duchateau et al.

(10) Patent No.: US 10,150,826 B2
(45) Date of Patent: Dec. 11, 2018

(54) METHOD FOR PREPARING ETHYLENE COPOLYMER

(71) Applicant: SABIC GLOBAL TECHNOLOGIES B.V., Bergen Op Zoom (NL)

(72) Inventors: Jan Nicolaas Eddy Duchateau, Paal (BE); Peter Neuteboom, Hoensbroek (NL); Diego Mauricio Castaneda Zuniga, Maastricht (NL); Markus Busch, Riedstadt (DE); Sebastian Bruno Fries, Darmstadt (DE)

(73) Assignees: SABIC GLOBAL TECHNOLOGIES B.V., Bergen Op Zoom (NL); TECHNISCHE UNIVERSITÄT, Darmstadt (DE)

( * ) Notice: Subject to any disclaimer, the term of this patent is extended or adjusted under 35 U.S.C. 154(b) by 0 days.

(21) Appl. No.: 15/327,526

(22) PCT Filed: Jul. 23, 2015

(86) PCT No.: PCT/EP2015/066854
§ 371 (c)(1),
(2) Date: Jan. 19, 2017

(87) PCT Pub. No.: WO2016/012534
PCT Pub. Date: Jan. 28, 2016

(65) Prior Publication Data
US 2017/0166668 A1    Jun. 15, 2017

(30) Foreign Application Priority Data
Jul. 24, 2014  (EP) ..................................... 14178318

(51) Int. Cl.
*C08F 210/02*    (2006.01)
*C08J 5/18*    (2006.01)
(Continued)

(52) U.S. Cl.
CPC ............. *C08F 210/02* (2013.01); *C08J 5/18* (2013.01); *C08J 2323/06* (2013.01)

(58) Field of Classification Search
CPC ......... C08F 210/02; C08F 238/00; C08F 2/38
(Continued)

(56) References Cited
U.S. PATENT DOCUMENTS 2,192,931 A * 3/1940 Paton et al. ............ C08F 10/00
                                                            526/235
3,299,016 A   1/1967 Sonnenfeld
3,857,821 A * 12/1974 Becker et al. .......... C08F 20/40
                                                            526/285

FOREIGN PATENT DOCUMENTS

DE   2044655 A1   3/1972
WO   2006094723   9/2006

OTHER PUBLICATIONS

International Search Report for PCT/EP2015/066854 dated Oct. 7, 2015, 9 pages.
Peacock, Andrew, "Handbook of Polyethylene" Chapter 3, Marcel Dekker, Inc. ISBN: 0-8247-9546-6 (2000) pp. 43-66.
Sonnenfeld, R.J., et al., "Ethylene-propylene terpolymers with conjugated double bonds", Journal of Applied Polymer Science, vol. 13, No. 2 (1969) pp. 365-368.
Written Opinion of the International Searching Authority for PCT/EP2015/066854 dated Oct. 7, 2015, 4 pages.

* cited by examiner

Primary Examiner — Fred M Teskin
(74) Attorney, Agent, or Firm — Cantor Colburn LLP (57) ABSTRACT

A process for preparing an ethylene copolymer in the presence of free-radical polymerization initiator at pressures from 150 MPa to 350 MPa and temperatures from 100° C. to 350° C., by copolymerizing ethylene and a comonomer having a C≡C bond and optionally further comonomers, wherein the comonomer having the C≡C bond is represented by formula

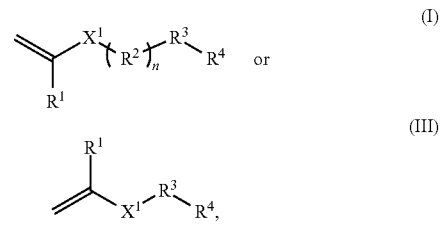

wherein
$R^1$ is hydrogen or methyl;
$X^1$ is —CO—O— or —CO—NH—;
$R^2$ is —$CH_2$—O—, —O—CO—, —$Si(CH_3)_2$—, —$Si(CH_3)_2$—O— or —$CR^5R^6$— wherein $R^5$ and $R^6$ are independently selected from hydrogen, methyl, ethyl and hydroxyl;
n is an integer from 1 to 32 and $R^2$ is same or different from each other when n is 2 to 32; and
$R^3$ is —C≡C— and $R^4$ is hydrogen, $C_1$-$C_{10}$ linear or branched alkyl, $C_1$-$C_{10}$ linear or branched hydroxyalkyl or phenyl, or the unit $R^3$-$R^4$ stands for

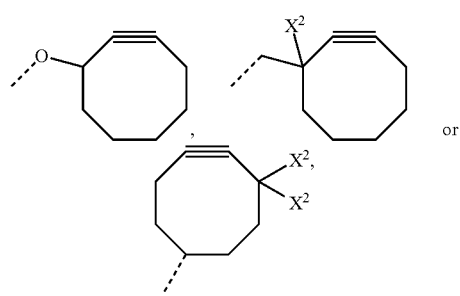

wherein $X^2$ is F, Cl, Br or I.

17 Claims, 2 Drawing Sheets

(51) Int. Cl.
  *C08F 2/38* (2006.01)
  *C08F 238/00* (2006.01)
  *C08F 4/34* (2006.01)
(58) Field of Classification Search
  USPC ........................................................ 526/285
  See application file for complete search history.

METHOD FOR PREPARING ETHYLENE COPOLYMER

This application is a national stage application of PCT/EP2015/066854 filed Jul. 23, 2015, which claims priority to European Patent Application Number 14178318.3 filed Jul. 24, 2014, both of which are hereby incorporated by reference in their entirety.

The invention relates to a process for preparing an ethylene copolymer. The invention further relates to such ethylene copolymer obtainable by the process.

There are many types of polyethylene made and sold today. One type of polyethylene is low density polyethylene (LDPE). LDPE includes low density polyethylene homopolymer and low density polyethylene copolymer polymerized from ethylene and a monomer copolymerizable therewith. LDPE can be used alone, blended or co-extruded for a variety of packaging, construction, agricultural, industrial and consumer applications. The largest application of LDPE is in films or sheets produced for example by the blown or cast extrusion process in both mono and co extrusions. Films and sheets made with LDPE exhibit good optical properties, strength, flexibility, seal ability and chemical inertness. The films or sheets may have a thickness of e.g. 5-500 µm, and may be used a single layer film or sheet, or as one or more layers in a multilayer film or sheet. The end-use applications include food packaging such as packaging of bakery items, snack foods, consumer durables, and non-food applications such as disposable diapers, textiles, agricultural film, shrink film, medical packaging and cable insulations, mulching film, protective film. The end-use applications also include injection moulded articles such as containers, bottles and rigid packaging (thickness of e.g. 25 µm-4 mm); blown moulded articles such as bottles and containers, sheet vacuum formed articles such as containers, pails, trays; polymer coatings, films or articles with enhanced adhesion to other substrates like paper, aluminum, steel and enhanced compatibility with other polymers like PET, PA, PC.

One known process for making LDPE is high pressure polymerisation of ethylene. The high pressure polymerisation process of ethylene is disclosed e.g. by Andrew Peacock (Handbook of Polyethylene. Marcel Dekker, Inc. ISBN: 0-8247-9546-6; 2000), in particular, at pages 43-66. Peacock describes the free radical chemical processes, the high pressure production facilities and the high pressure reaction conditions.

High pressure reactors are suitable both for the preparation of a homopolymer of ethylene and for the preparation of a copolymer of ethylene and one or more comonomers copolymerizable therewith. The high pressure reactors for LDPE can take one of two forms being either an autoclave, with a height-to-diameter ratio in the region of 2-20, or a tubular reactor, with a length-to-diameter ratio from a few hundred up to tens of thousands. These two divergent reactor geometries pose uniquely different chemical engineering problems requiring disparate control conditions. Tubular and autoclave reactors with their disparate profiles require different methods of temperature control.

The autoclave process and the tubular process result in different chain architecture (Tackx and Tacx, Polymer Volume 39, number 14, pp 3109-3113, 1998) and different molecular weight distribution of the polymer (Kaltenbacher, Vol 50, No 1, January 1967, TAPPI). Polymerizing in a tubular reactor has advantages that higher turnovers can be achieved in the polymerization process, the process is easier to scale-up and it is accordingly possible to build "world-scale" plants and the polymerization is in general more economic because of a lower specific consumption of utilities such as electricity and cooling water. On the other hand, for preparation of LDPE copolymers with very high comonomer content, it is more convenient to use autoclave reactors.

A new type of LDPE is still in demand. For example, WO2006094723 describes a process for the preparation of a copolymer of ethylene and a di- or higher functional (meth)acrylate in a tubular reactor. According to WO2006094723, the process resulted in good combination of web stability, neck-in and draw down, adhesion, printability, barrier properties, hot tack and heat-sealing performance.

It is an objective of the present invention to provide a new type of ethylene copolymer which can be used for various applications.

Accordingly, the invention provides a process for preparing ethylene copolymers in the presence of free-radical polymerization initiator at pressures in the range of from 150 MPa to 350 MPa and temperatures in the range of from 100° C. to 350° C. by copolymerizing ethylene and a comonomer having a C≡C bond and optionally further comonomers, wherein the comonomer having the C≡C bond is represented by formula wherein
R$^1$ is hydrogen or methyl;
X$^1$ is —CO—O— or —CO—NH—;
R$^2$ is —CH$_2$—O—, —O—CO—, —Si(CH$_3$)$_2$—, —Si(CH$_3$)$_2$—O— or —CR$^5$R$^6$— wherein R$^5$ and R$^6$ are independently selected from hydrogen, methyl, ethyl and hydroxyl;
n is an integer from 1 to 32 and R$^2$ is same or different from each other when n is 2 to 32; and
R$^3$ is —C≡C— and R$^4$ is hydrogen, C$_1$-C$_{10}$ linear or branched alkyl, C$_1$-C$_{10}$ linear or branched hydroxyalkyl or phenyl
or
the unit R$^3$-R$^4$ stands for wherein X$^2$ is F, Cl, Br or I.

The process of the present invention is suitable for preparing ethylene copolymers. For the purposes of the present invention, polymers are all substances which are made up of at least two monomer units. They are preferably LDPE polymers having a number-average molecular weight $M_n$ of at least 5.0 kg/mol and/or a weight average molecular weight $M_w$ of at least 50 kg/mol. However, the method of the invention can also be advantageously employed in the preparation of oligomers, waxes and polymers having a molecular weight $M_n$ of less than 5.0 kg/mol or waxes and polymers having a molecular weight $M_w$ of less than 50 kg/mol. $M_n$ and $M_w$ can e.g. be determined by gel permeation chromatography (GPC). The gel permeation chromatography may be performed according to the method described in the experimental section.

The obtained ethylene copolymer comprises a C≡C bond. The obtained ethylene copolymer can be directly used for the manufacture of final products or blends. Alternatively, the obtained ethylene copolymer can be used as an intermediate product for the manufacture of other ethylene based polymers.

The C=C bond of the compounds (I) and (III), together with ethylene, react with generated radicals and incorporates the compounds (I) and (III) in the growing polymer chain. It was surprisingly found that C≡C bonds present in compounds (I) and (III) do not react with generated radicals and is maintained in the copolymer obtained as branches of the main chain. No crosslinking originating from the C≡C bond was observed. It was therefore surprisingly found that an ethylene copolymer having branches comprising C≡C bonds can be made according to the present invention. It is known that trace amounts of acetylene during the high pressure polymerization of ethylene leads to an uncontrollable reaction (runaway reaction) which produces excessive heat and hence copolymerization involving ethylene and compounds with C≡C bonds was considered to be extremely difficult. For example, Zhang et.al., Runaway Phenomena in Low-Density Polyethylene Autoclave Reactors, AlChE Journal, October 1996 Vol. 42, No. 10, mentions on p. 2920 that small amounts of impurities (e.g., acetylene) can be found in the reactor feed and they can decompose into free radicals and induce runaway reactions. The present inventors have surprisingly found that the compounds (I) and (III) do not cause runaway reactions like acetylene under high pressure conditions. The compounds (I) and (III) do not undergo a thermal decomposition during the copolymerization and the C≡C bond is maintained in the final ethylene copolymer.

As the comonomer having a C≡C bond, the compounds (I) and (III) may be used individually or in combination with each other in the process of the invention.

Preferably, only one type of the comonomer having a C≡C bond is used in the process of the invention for easy control of the process conditions.

Examples of preferred embodiments of compounds (I) and (III) are mentioned below.

For compound (I):
Preferably, $X^1$ is —CO—O—.
Preferably, $R^2$ is —CH$_2$—.
Preferably, n is from 1 to 22, more preferably from 1 to 12, even more preferably from 1 to 5, even more preferably 1.

Preferably, $R^3$ is —C≡C— and $R^4$ is methyl or hydrogen, most preferably hydrogen; or
$R^3$-$R^4$ stands for Particularly preferred embodiments of compound (I) include:
propargyl acrylate ($R^1$=hydrogen, $X^1$=—CO—O—, $R^2$=—CH$_2$—, n=1, $R^3$=—C≡C— and $R^4$=hydrogen),
propargyl methacrylate ($R^1$=methyl, $X^1$=—CO—O—, $R^2$=—CH$_2$—, n=1, $R^3$=—C≡C— and $R^4$=hydrogen) and
2-methyl-acrylic acid 3-(cyclooct-2-ynyloxy)-propyl ester ($R^1$=methyl, $X^1$=—CO—O—, $R^2$=—CH$_2$—, n=3 and $R^3$—$R^4$=

For compound (III):
Preferably, $X^1$ is —CO—O—.
Preferably, $R^3$ is —C≡C— and $R^4$ is methyl or hydrogen, most preferably hydrogen.

The process of the invention is carried out at pressures of from 150 MPa to 350 MPa. The pressures may preferably be 160 MPa to 300 MPa or more preferably 160 MPa to 280 MPa. The temperatures are in the range from 100° C. to 350° C., preferably from 120° C. to 340° C. and more preferably from 150° C. to 320° C.

It is important that the compound (I) and (III) does not undergo decomposition during the copolymerization. The temperature and pressure should be chosen to ensure that decomposition does not occur. High pressure DTA analysis may be carried out on compound (I) and (III) for determining its thermal stability to choose the temperature and pressure for the copolymerization.

In particularly preferred embodiments, the comonomer having a C≡C bond is propargyl methacrylate or propargyl acrylate and the process of the invention is carried out at 150° C. to 210° C., preferably at 160 MPa to 250 MPa.

Preferably, the total amount of the comonomer having a C≡C bond is 0.1-10 mol % of the total weight of ethylene and all comonomers, more preferably 0.15-8 mol %, 0.2-6 mol %, 0.2-3 mol % or 0.2-1 mol %, of the total weight of ethylene and all comonomers.

Preferably, the ethylene copolymer according to the present invention has a density of 915 to 935 kg/m³ according to ISO1183, for example from 920 to 928 kg/m³.

Preferably, the ethylene copolymer according to the present invention has a melt flow rate of 0.10 g/10 min to 80 g/10 min according to ISO1133:2011 measured at 190° C. and 2.16 kg, for example from 0.1 to 4 g/10 min, for example from 0.3 to 3 g/10 min, for example from 0.2 to 2 g/10 min, for example from 0.5 to 1.5 g/10 min.

The process of the present invention is not only suitable for the copolymerization of ethylene and the compounds (I) and (III) but also for the copolymerization of ethylene, the compounds (I) and (III) and one or more further comonomers which are free-radically copolymerizable with ethylene under high pressure. Examples of suitable further comomers are α,β-unsaturated $C_3$-$C_8$-carboxylic acids, in particular maleic acid, fumaric acid, itaconic acid, acrylic acid, methacrylic acid and crotonic acid, derivatives of α,β-unsaturated $C_3$-$C_8$-carboxylic acids, e.g. unsaturated $C_3$-$C_{15}$-carboxylic esters, in particular esters of $C_1$-$C_6$-alkanols, or anhydrides, in particular methyl methacrylate, ethyl methacrylate, n-butyl methacrylate or tert-butyl methacrylate, methyl acrylate, ethyl acrylate, n-butyl acrylate, 2-ethylhexyl acrylate, tert-butyl acrylate, methacrylic anhydride, maleic anhydride or itaconic anhydride, and 1-olefins such as propene, 1-butene, 1-pentene, 1-hexene, 1-octene or 1-decene. In addition, vinyl carboxylates, particularly preferably vinyl acetate, can be used as comonomers. n-butyl acrylate, acrylic acid or methacrylic acid are particularly advantageously used as comonomer. In the case of a copolymerization of ethylene, the compounds (I) and (III) and further comonomers, the proportion of the further comonomer or the further comonomers in the reaction mixture is from 1 to 45% by weight, preferably from 3 to 30% by weight, based on the amount of all monomers, i.e. the sum of ethylene and all comonomers. Depending on the type of the further comonomer, it can be preferred to feed the further comonomers at a plurality of different points to the reactor.

The reaction can be optimally controlled by metering different initiators or mixtures of initiators at different initiator injection points. Possible initiators for starting the free-radical polymerization are, for example, air, oxygen, azo compounds or peroxidic polymerization initiators. Initiation using organic peroxides or azo compounds represents a particularly preferred embodiment of the process of the invention. Examples of suitable organic peroxides are peroxy esters, peroxy ketals, peroxy ketones and peroxycarbonates, e.g. di(2-ethylhexyl) peroxydicarbonate, dicyclohexyl peroxydicarbonate, diacetyl peroxydicarbonate, tert-butyl peroxyisopropylcarbonate, di-tert-butyl peroxide, di-tert-amyl peroxide, dicumyl peroxide, 2,5-dimethyl-2,5-di-tert-butylperoxyhexane, tert-butyl cumyl peroxide, 2,5-dimethyl-2,5-di(tert-butylperoxy)hex-3-yne, 1,3-diisopropyl monohydroperoxide or tert-butyl hydroperoxide, didecanoyl peroxide, 2,5-dimethyl-2,5-di(2-ethylhexanoyl-peroxy) hexane, tert-amyl peroxy-2-ethylhexanoate, dibenzoyl peroxide, tert-butyl peroxy-2 ethyl-hexanoate, tert-butyl peroxydiethylacetate, tert-butyl peroxydiethylisobutyrate, tert-butyl peroxy-3,5,5-trimethylhexanoate, 1,1-di(tert-butylperoxy)-3,3,5-trimethylcyclohexane, 1,1-di(tert-butyl-peroxy)cyclohexane, tert-butyl peroxyacetate, cumyl peroxyneodecanoate, tert-amyl peroxy-neodecanoate, tert-amyl peroxypivalate, tert-butyl peroxyneodecanoate, tert-butyl permaleate, tert-butyl peroxypivalate, tert-butyl peroxyisononanoate, diisopropylbenzene hydroperoxide, cumene hydroperoxide, tert-butyl peroxy benzoate, methyl isobutyl ketone hydroperoxide, 3,6,9-triethyl-3,6,9-trimethyl-triperoxocyclononane and 2,2-di(tert-butylperoxy)butane. Azoalkanes (diazenes), azodicarboxylic esters, azodicarboxylic dinitriles such as azobisisobutyronitrile and hydrocarbons which decompose into free radicals and are also referred as C—C initiators, e.g. 1,2-diphenyl-1,2-dimethylethane derivatives and 1,1,2,2-tetramethylethane derivatives, are also suitable. It is possible to use either individual initiators or preferably mixtures of various initiators.

In general the concentration of added initiator is less than 200 ppm. Thus, the resulting resins are not greatly contaminated by initiator residues and normally require no purification prior to use. Certain initiator residues can impart an off taste or smell to resins, making them undesirable in food packaging applications. In some embodiments of the present invention, the free-radical polymerization initiator, which is fed to a reaction zone, is a single type of azo compound or organic peroxide. In other embodiments of the present invention, the free-radical polymerization initiator, which is fed to a reaction zone, is a mixture of at least two different azo compounds or organic peroxides. If such initiator mixtures are used these may be fed to all reaction zones. Alternatively, some reaction zones (e.g. first two zones) may be fed with initiator mixes and other reaction zones (e.g. last two zones) may be fed with a single type of initiator. There is no limit for the number of different initiators in such a mixture, however the mixtures may be composed of from two to six and in particular of four or five different initiators. Particular preference is given to using mixtures of initiators which have different decomposition temperatures.

Additionally, peroxide is typically added together with a peroxide solvent which typically comprises $C_2$-$C_{20}$ normal or iso-paraffin. The solutions comprise the initiators or initiator mixtures in proportions of from 2 to 65% by weight, preferably from 5 to 40% by weight and particularly preferably from 10 to 30% by weight.

The process of the present invention can be carried out with all types of tubular reactors suitable to high-pressure polymerization. Such reactors can have one or more reaction zones and have preferably from 2 to 6 reaction zones and particularly preferably from 3 to 5 reaction zones. The number of reaction zones is given by the number of injection points for the initiator. That means, in each reaction zone, polymerization is initiated by addition of initiators which decompose into free radicals. Usually each reaction zone is followed by a zone of the tubular reactor in which cooling of the reaction mixture occurs. Preferred tubular reactors have a length-to-diameter ratio of greater than 1000, preferably from 10000 to 40000 and especially from 25000 to 35000. Residence time may generally be between 60 to 300 s.

Preferably the comonomer having a C≡C bond is first mixed with ethylene before it is brought into contact with the free-radical polymerization initiator. Such a mixture of ethylene and the comonomer having a C≡C bond can be fed only to the inlet of the tubular reactor. It is also possible to feed more than one stream of ethylene and the comonomer having a C≡C bond and feed accordingly one or more of these streams as side stream to the tubular reactor.

The process of the present invention can also be carried out with all types of autoclave reactor. Such reactors generally have height to diameter ratios from 2 up to 20. Residence time may generally be between 8 up to 120 s. Autoclave reactors, based on its temperature profile are classifed in monozone or multizone reactors, controlled by the number of initiator injection points and/or by the presence of for example baffles in the reactor.

The process of the present invention can be carried out in a single tubular reactor or a single autoclave reactor. The process of the present invention can also be carried out in 2 or more tubular reactors connected in series, 2 or more autoclave reactors connected in series or an autoclave reactor and a tubular reactor connected in series. Such a process for producing polymers or copolymers of ethylene using an autoclave reactor and a tubular reactor connected in series is known e.g. from U.S. Pat. No. 4,496,698.

During the polymerisation it is possible to add for example inhibitors, scavengers and/or a chain regulator (chain transfer agent). Suitable chain regulators include an aldehyde for example propionaldehyde, a ketone for example acetone or an aliphatic hydrocarbon for example propane and propene. Chain transfer is the process by which the growth of a polyethylene chain is terminated in such a way that the free radical associated with it transfers to another molecule on which further chain growth occurs, i.e., the number of free radicals and growing chains remains constant. The molecule to which the free radical is transferred can be either ethylene or a deliberately added chain transfer agent (CTA) such as a solvent molecule. The net effect of adding a chain transfer agent is to reduce the average molecular weight of the resin.

Examples of suitable chain transfer agents include cyclopropane, methane, t-butanol, perfluoropropane, deuterobenzene, ethane, ethylene oxide, 2,2-dimethylpropane, benzene, dimethyl sulfoxide, vinyl methyl ether, methanol, propane, 2-methyl-3-buten-2-ol, methyl acetate, t-butyl acetate, methyl formate, ethyl acetate, butane, triphenylphosphine, methylamine, methyl benzoate, ethyl benzoate, N,N-diisopropylacetamide, 2,2,4-trimethylpentane, n-hexane, isobutane, dimethoxymethane, ethanol, n-heptane, n-butyl acetate, cyclohexane, methylcyclohexane, 1,2-dichlorethane, acetonitrile, N-ethylacetamide, propylene, n-decane, N,N-diethylacetamide, cyclopentane, acetic anhydride, n-tridecane, n-butyl benzoate, isopropanol, toluene, acetone, 4,4-dimethylpentene-1, trimethylamine, N,N-dimethylacetamide, isobutylene, n-butyl isocyanate, methyl butyrate, n-butylamine, N,N-dimethylformamide, diethyl sulfide, diisobutylene, tetrahydrofuran, 4-methylpentene-1, p-xylene, p-dioxane, trimethylamine, butene-2, 1-bromo-2-chlorethane, octene-1,2-methylbutene-2, cumene, butene-1, methyl vinyl sulfide, n-butyronitrile, 2-methylbutene-1, ethylbenzene, n-hexadecene, 2-butanone, n-butyl isothiocyanate, methyl 3-cyanopropionate, tri-n-butylamine, 3-methyl-2-butanone, isobutyronitrile, di-n-butylamine, methyl chloroacetate, 3-methylbutene-1, 1,2-dibromoethane, dimethylamine, benzaldehyde, chloroform, 2-ethylhexene-1, propionaldehyde, 1,4-dichlorobutene-2, tri-n-butylphosphine, dimethylphosphine, methyl cyanoacetate, carbon tetrachloride, bromotrichloromethane, di-n-butylphosphine, acetaldehyde , hydrogen and phosphine.

Preferably, the copolymerization is performed in the presence of a chain transfer agent selected from the group consisting of propionaldehyde, n-heptane, propylene, propane, isopropanol and acetone.

The invention further relates to an ethylene copolymer obtainable by the process of the invention.

The invention further relates to an ethylene copolymer comprising C≡C bond as determined by HT-$^1$H-NMR and HT-$^{13}$C-NMR.

Preferably, the ethylene copolymer has $M_n$ of at least 5.0 kg/mol and/or $M_w$ of at least 50 kg/mol. $M_n$ and $M_w$ may be determined by gel permeation chromatography, e.g. by the methods described in the experimental section.

The invention further relates to articles comprising the ethylene copolymer according to the invention. Preferably, the ethylene copolymer of the article has $M_n$ of at least 5.0 kg/mol and/or $M_w$ of at least 50 kg/mol. The articles may be films or sheets; in particular films produced for example by the blown or cast extrusion process in both mono and co extrusions. The films may e.g. be packaging of bakery items, snack foods, consumer durables, disposable diapers, textiles, agricultural film, shrink film, medical packaging and cable insulations.

The films or sheets according to the invention may have a thickness of e.g. 5-500 μm, and may be used a single layer film or sheet, or as one or more layers in a multilayer film or sheet. The articles according to the invention include food packaging such as packaging of bakery items, snack foods, consumer durables, and non-food applications such as disposable diapers, textiles, agricultural film, shrink film, medical packaging and cable insulations, mulching film, protective film. The articles according to the invention also include injection moulded articles such as containers, bottles and rigid packaging (thickness of e.g. 25 μm-4 mm); blown moulded articles such as bottles and containers, sheet vacuum formed articles such as containers, pails, trays; polymer coatings. The articles according to the invention also include articles with enhanced adhesion to other substrates like paper, aluminum, steel and enhanced compatibility with other polymers like PET (polyethylene terephthalate), PA (polyamide), PC (polycarbonate).

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The invention is now elucidated by way of the following examples, without however being limited thereto.

EXAMPLES

A low density ethylene copolymer comprising a triple bond was prepared in a 100 mL autoclave in batch operation.

In the first step, a solution of propargyl methacrylate (PMA) and n-heptane as a chain transfer agent was injected in the autoclave and further ethylene was charged in order to increase pressure up to about 1300 to 1500 bar. Subsequently a solution of tert-butyl peracetate (TBPA)/n-heptane was injected and the pressure was adjusted to 1900 bar.

The reaction conditions and the injected composition are summarized in Table 1.

Due to decomposition of the initiator the polymerization was started and a temperature rise was observed. After the reaction was finished, the pressure was released and the material was collected. The results are summarized in Table 2.

TABLE 1

|  | T °C. | pressure bar | ethylene mol % | PMA mol % | n-heptane mol % | TBPA mol ppm |
|---|---|---|---|---|---|---|
| Ex 1 | 190 | 1900 | 98.4 | 0.4 | 1.6 | 18 |

TABLE 2

|  | $M_n$ (kg/mol) | $M_w$ (kg/mol) | conversion (%) |
|---|---|---|---|
| Ex 1 | 12 | 84 | 3.5 |

$M_n$ and $M_w$ were determined by gel permeation chromatography (GPC). The GPC equipment was High-temperature GPC IR5 from Polymerchar with following details:
Detector: IR5 PolymerChar (filter: $CH_{total}$, $CH_2$, $CH_3$)
Autosampler: Agilent 1200

High-temperature (linear) columns:
3× Shodex UT 806M (30 μ particle size, 10000 Å max. pore size) and
1× Shodex UT 807 (30μ particle size, 20000 Å max. pore size) connected in series
Guard column:
Shodex UT-G (30μ particle size)
Sample preparation for GPC:
sample concentration: 1.5 mg/ml
Mass of polymer sample: 10-20 mg (weighted in a 10 ml vial)+butylated hydroxytoluene (BHT) as stabilizer
Solvent: 1,2,4-Trichlorobenzene (TCB)
Solvent volume added by autosampler: 8 mL
Solution temperature controlled by autosampler: 160° C.
Solution time controlled by autosampler: 60 min
Measurement conditions:
Injection volume: 200 μL
Flow rate : 1.0 mL/min
Columns and detector temperature: 150° C.
Eluent: 1,2,4-Trichlorobenzene (TCB)

The $CH_{total}$ signal from IR5 is used as concentration detector. A conventional calibration curve with polyethylene standards (compare following table) is used to convert the measured data to a molecular weight distribution.

Standards for Polyethylene: Molar mass at peak maximum
PE(Mp) [g/mol]

| |
|---|
| 338 |
| 507 |
| 1180 |
| 2030 |
| 22000 |
| 33500 |
| 55000 |
| 73000 |
| 99000 |
| 126000 |
| 168276 |
| 558239 |
| 1050517 |

Software:
Control software: PolymerChar GPC IR
Data processing software: PSS WinGPC Unity 7.4.0 (conventional calibration)
Wyatt ASTRA (light scattering)
Data processing:
dn/dc (at 658nm): 0.104
plotting formalism: Zimm (1$^{st}$ order)
linear references: $<R_g^2>^{1/2}=0.0286*M^{0.575}$ [nm]
$<\eta>=0.053*M^{0.703}$ [mL/g]
Zimm-Stockmayer-model: trifunctional polydisperse Further, HT-$^1$H-NMR and HT-$^{13}$C-NMR were carried out on the obtained copolymer at 100° C. using $C_2D_2Cl_4$ as the solvent. Details of HT-$^1$H-NMR and HT-$^{13}$C-NMR are as follows:
Bruker DRX 500 (500 MHz) spectrometer was used.
$^1$H-NMR (500.13 MHz), $^{13}$C-NMR (125.77 Mhz), 5 mm probe
$^1$H-NMR: 30° pulse (11.1 μs), spectral width 10.33 kHz, relaxation delay (d1) 0.5 s, acquisition time 3.172 s, 64-80 Scans
$^{13}$C-NMR: 30° pulse (7.4 μs), spectral width 37.0 kHz, relaxation delay (d1) 0.4 s, acquisition time 0.8848 s, 2000-20000 Scans, $^1$H-broad band decoupled used concentrations: 1.1 wt % ($^1$H, $C_2D_2Cl_4$, T=100° C.), 6.8 wt % ($^{13}$C, toluene, T=90° C.)

Figure 1:
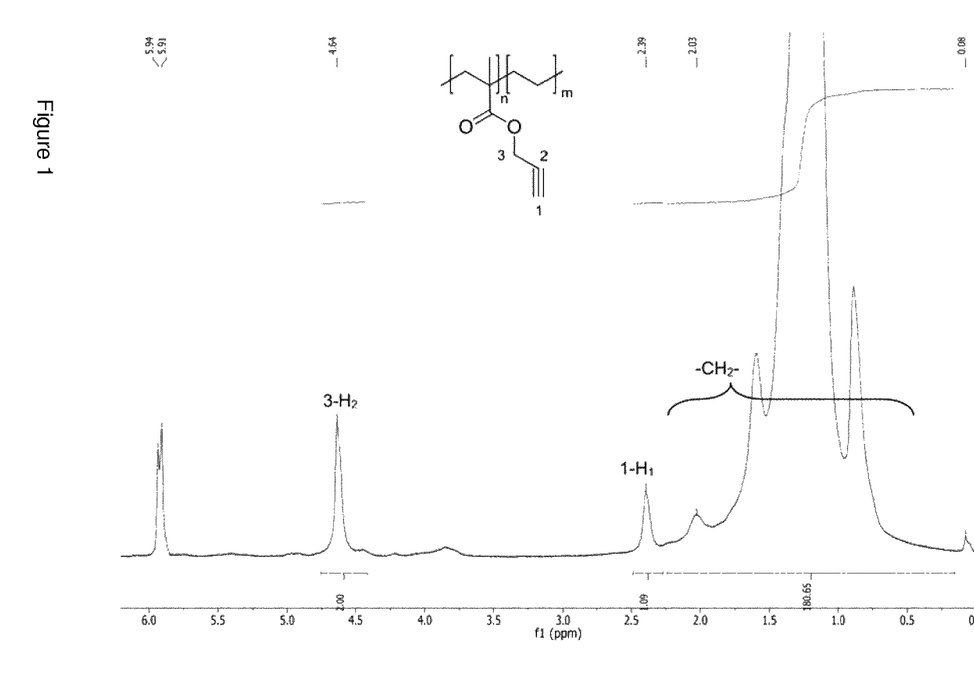
FIG. 1 shows the results of HT-1H-NMR and HT-13C-NMR of an embodiment.

The results of HT-$^1$H-NMR and HT-$^{13}$C-NMR are shown in FIG. 1. All signals of the incorporated monomer and triple bond function can be clearly allocated via HT-$^1$H-NMR and HT-$^{13}$C-NMR, confirming the presence of the triple bond in the copolymer. In addition, the signals of 3-$H_2$ and 1-$H_1$ show a ratio of 2:1, which is the same supposed from the molecular structure. This indicates that the triple bond itself does not or only rarely undergo side or consecutive reactions.

Hence, it can be confirmed that a copolymer of ethylene and PMA was obtained, comprising a triple bond.

Experiment Set II

A copolymer of ethylene and propargyl acrylate (II-1) and a copolymer of ethylene and 3-(But-3-en-1-yloxy)cyclooct-1-yne (II-2) were prepared.

The synthesis of the copolymers was performed in a stirred 100 mL autoclave (900 rpm) which is running in batch operation mode. An overview of the used compounds is given in table 3.

TABLE 3

List of used compounds.

| compound | manufacturer | purity/class |
|---|---|---|
| ethylene | Air Liquide | 3.0, catalytic purified |
| propargyl acrylate | Alfa Aesar | 96% |
| 3-(But-3-en-1-yloxy)cyclooct-1-yne | Syncom | pure |
| TBPEH | United Initiators | techn. pure |
| TAPP | United Initiators | 75% |
| n-heptane | Acros Organics | 99+% |
| nitrogen | Westphal | 5.0 |
| MMAO-3A | Dow Chemical | 7 wt % in n-heptane |

TBPEH = tert-butyl peroxy-2-ethylhexanoate
TAPP = tert-amyl peroxypivalate

Prior to polymerization the reactor Was purged. A MMAO-3A (modified methylaluminoxane) solution (13 mmol/L) was filled in the reactor and was stirred for 1 h at 300 bar and room temperature in order to minimize $H_2O$ and $O_2$ content. Afterwards MMAO was removed by flushing with ethylenene for 10 min, 5 min and 5 min at 500 bar, 1000 bar and 1500 bar respectively. Then the pressure was reduced to 150 bar, the reactor was heated up and the experiment was started.

II-1 Copolymer of Ethylene and Propargyl Acrylate

The reaction conditions for the copolymerization with propargyl acrylate are summarized in table 2.

TABLE 4

Reaction conditions for the production of poly(etylene-co-propargyl acrylate) in the 100 mL autoclave.

| T (° C.) | p (bar) | x($C_2H_4$) (mol %) | x(PA) (mol %) | x(n-heptane) (mol %) | x(TBPEH) (mol ppm) |
|---|---|---|---|---|---|
| 160 | 2000 | 97 | 0.4 | 2.6 | 36 |

PA = propargyl acrylate
TBPEH = tert-butyl peroxy-2-ethylhexanoate

Mixtures of PA/n-heptane and TBPEH/n-heptane were filled in glass vials and stripped with nitrogen for several minutes. In parallel the injection line was evacuated and after that the PA/n-heptane solution was sucked in the line. The solution was injected together with ethylene into the reactor yielding a pressure of about 1100 bar. This was followed by the second injection with TBPEH/n-heptane to a pressure of about 2100 bar. Due to decomposition of the initiator the polymerization started and a temperature rise was caused. After the experiment was finished the pressure was released to 200 bar and the reactor was flushed at 500 bar for 5 min. The reactor was depressurized and the material was collected.

Figure 2:
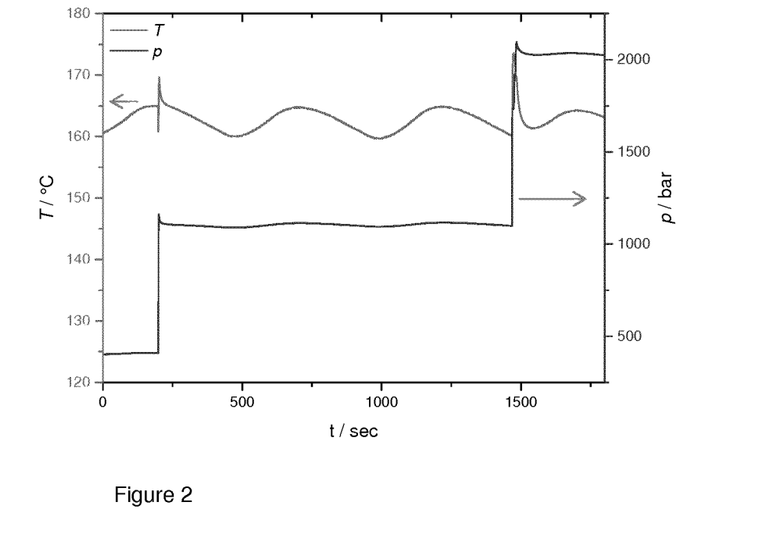
FIG. 2 shows temperature and pressure profiles of an embodiment.

The obtained temperature and pressure profiles are given in FIG. 2.

II-2 copolymer of ethylene and 3-(But-3-en-1-yloxy)cyclooct-1-yne

The reaction conditions for the copolymerization with 3-(But-3-en-1-yloxy)cyclooct-1-yne are summarized in table 5.

TABLE 5

Reaction conditions for the production of poly(etylene-co-3-(But-3-en-1-yloxy)cyclooct-1-yne) in the 100 mL autoclave.

| T (° C.) | p (bar) | x($C_2H_4$) (mol %) | x(CoM) (mol %) | x(n-heptane) (mol %) | x(TAPP) (mol ppm) |
|---|---|---|---|---|---|
| 110 | 2000 | 97.3 | 0.1 | 2.6 | 12 |

CoM = 3-(But-3-en-1-yloxy)cyclooct-1-yne
TAPP = tert-amyl peroxypivalate Mixtures of CoM/n-heptane and TAPP/n-heptane were filled in glass vials and stripped with nitrogen for several minutes. In parallel the injection line was evacuated and after that the CoM/n-heptane solution was sucked in the line. The solution was injected together with ethylene into the reactor yielding a pressure of about 1350 bar. This was followed by the second injection with TAPP/n-heptane to a pressure of about 2100 bar. Due to decomposition of the initiator the polymerization started and a temperature rise was caused. After the experiment is finished the pressure is released to 200 bar and the reactor was flushed at 500 bar for 5 min. The reactor was depressurized and the material was collected.

Figure 3:
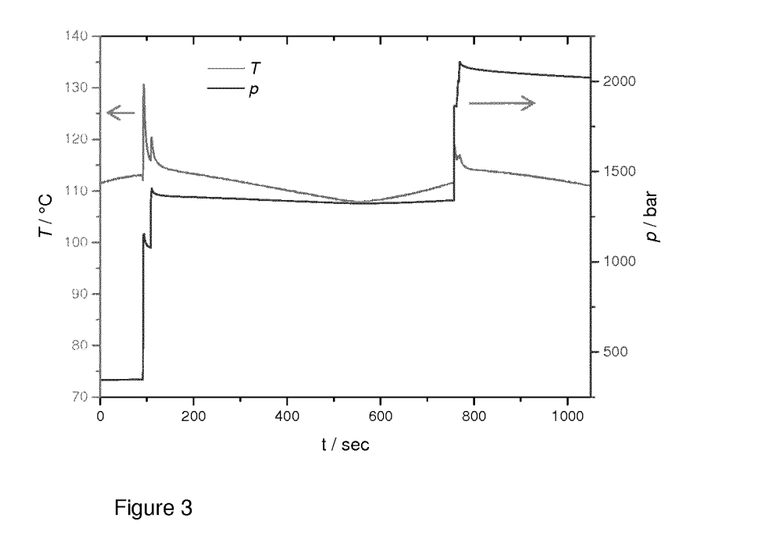
FIG. 3 shows temperature and pressure profiles of an embodiment.

The obtained temperature and pressure profiles are given in FIG. 3.

The invention claimed is:

1. A process for preparing an ethylene copolymer in the presence of free-radical polymerization initiator at pressures in the range of from 150 MPa to 350 MPa and temperatures in the range of from 100° C. to 350° C. by copolymerizing ethylene and a comonomer having a C≡C bond and optionally further comonomers, wherein the comonomer having the C≡C bond is represented by formula

(I)

(III)

wherein
$R^1$ is hydrogen or methyl;
$X^1$ is —CO—O— or —CO—NH—;

$R^2$ is —$CH_2$—O—, —O—CO—, —Si$(CH_3)_2$—, —Si$(CH_3)_2$—O— or —$CR^5R^6$— wherein $R^5$ and $R^6$ are independently selected from hydrogen, methyl, ethyl and hydroxyl;
n is an integer from 1 to 32 and $R^2$ is same or different from each other when n is 2 to 32; and
$R^3$ is —C≡C— and $R^4$ is hydrogen, $C_1$-$C_{10}$ linear or branched alkyl, $C_1$-$C_{10}$ linear or branched hydroxyalkyl or phenyl, or the unit $R^3$-$R^4$ stands for or wherein $X^2$ is F, Cl, Br or I, and
wherein the copolymerization is performed in the presence of a chain transfer agent selected from the group consisting of propionaldehyde, n-heptane, propylene, propane, isopropanol and acetone.

2. The process according to claim 1, wherein the comonomer having the C≡C bond is compound (I) wherein $X^1$ is —CO—O—, $R^2$ is —$CH_2$—, n is from 1 to 22, and $R^3$ is —C≡C—and $R^4$ is methyl or hydrogen or $R^3$-$R^4$ stands for 3. The process according to claim 1, wherein the comonomer having the C≡C bond is selected from the group consisting of propargyl acrylate, propargyl methacrylate and 2- methyl-acrylic acid 3-(cyclooct-2-ynyloxy)-propyl ester.

4. The process according to claim 1, wherein the comonomer having the C≡C bond is propargyl methacrylate or propargyl acrylate.

5. The process according to claim 4, wherein the copolymerization is performed at temperatures of 150° C. to 210° C. and at pressures from 160 MPa and 250 MPa.

6. The process according to claim 1, wherein the amount of the comonomer having the C≡C bond is 0.1-10 mol % of the total weight of ethylene and all comonomers.

7. The ethylene copolymer obtained by the process of claim 1.

8. The ethylene copolymer according to claim 7, wherein the ethylene copolymer has a number average molecular weight $M_n$ of at least 5.0 kg/mol and/or a weight average molecular weight $M_w$ of at least 50 kg/mol.

9. An article comprising the ethylene copolymer according to claim 7.

10. The article according to claim 9, wherein the article is a film or sheet.

11. The article according to claim 10, wherein the film is or is a component of food packaging , consumer durable packaging, disposable diapers, textiles, agricultural film, shrink film, medical packaging, cable insulations, mulching film, protective film, or polymer coatings.

12. The article according to claim 11, wherein the film or sheet has a thickness of 5 to 500 micrometers.

13. The article according to claim 9, wherein the article is an injection moulded article, a blow moulded article, a sheet vacuum formed article, or a polymer coating.

14. The article according to claim 13, wherein the article is a container, bottle, rigid packaging, pail, or tray.

15. A process for preparing an ethylene copolymer in the presence of free-radical polymerization initiator at pressures in the range of from 150 MPa to 350 MPa and temperatures in the range of from 100° C. to 350° C. by copolymerizing ethylene and a comonomer having a C≡C bond and optionally further comonomers, wherein the comonomer having the C≡C bond is represented by formula wherein
- $R^1$ is hydrogen or methyl;
- $X^1$ is —CO—O— or —CO—NH—;
- $R^2$ is —CH$_2$—O—, —O—CO—, —Si(CH$_3$)$_2$—, —Si(CH$_3$)$_2$—O— or —CR$^5$R$^6$— wherein $R^5$ and $R^6$ are independently selected from hydrogen, methyl, ethyl and hydroxyl;
- n is an integer from 1 to 32 and $R^2$ is same or different from each other when n is 2 to 32; and
- $R^3$ is —C≡C— and $R^4$ is hydrogen, $C_1$-$C_{10}$ linear or branched alkyl, $C_1$-$C_{10}$ linear or branched hydroxyalkyl or phenyl, or the unit $R^3$-$R^4$ stands for wherein $X^2$ is F, Cl, Br or I, and
wherein the process is performed in a tubular reactor.

16. A process for preparing an ethylene copolymer in the presence of free-radical polymerization initiator at pressures in the range of from 150 MPa to 350 MPa and temperatures in the range of from 100° C. to 350° C. by copolymerizing ethylene and a comonomer having a C≡C bond and optionally further comonomers, wherein the comonomer having the C≡C bond is represented by formula wherein
- $R^1$ is hydrogen or methyl;
- $X^1$ is —CO—O—;
- $R^2$ is —CH$_2$—;
- n is an integer from 1 to 22; and
- $R^3$ is —C≡C— and $R^4$ is methyl or hydrogen or $R^3$-$R^4$ stands for 17. The process according to claim 16, wherein the copolymerization is performed in the presence of a chain transfer agent selected from the group consisting of propionaldehyde, n-heptane, propylene, propane, isopropanol and acetone.

* * * * *